US 6,747,812 B2

(12) United States Patent
Ota et al.

(10) Patent No.: US 6,747,812 B2
(45) Date of Patent: Jun. 8, 2004

(54) OBJECTIVE LENS FOR OPTICAL PICK-UP APPARATUS AND OPTICAL PICK-UP APPARATUS

(75) Inventors: Kohei Ota, Hachioji (JP); Hidekazu Totsuka, Hachioji (JP); Yuichi Atarashi, Hachioji (JP)

(73) Assignee: Konica Corporation, Tokyo (JP)

(*) Notice: Subject to any disclaimer, the term of this patent is extended or adjusted under 35 U.S.C. 154(b) by 0 days.

(21) Appl. No.: 10/298,008

(22) Filed: Nov. 18, 2002

(65) Prior Publication Data

US 2003/0103272 A1 Jun. 5, 2003

(30) Foreign Application Priority Data

Nov. 21, 2001 (JP) ......................... 2001-355791

(51) Int. Cl.$^7$ ................. G02B 13/18; G02B 21/02; G02B 7/00
(52) U.S. Cl. ................. 359/719; 359/661; 369/112.01
(58) Field of Search ................. 359/656–661, 359/719, 112.01–112.29

(56) References Cited

U.S. PATENT DOCUMENTS 6,498,689 B2 * 12/2002 Katsuma ............... 359/719
6,643,245 B2 * 11/2003 Yamamoto et al. ..... 369/112.01
2001/0021070 A1 * 9/2001 Ishi et al. ............... 359/719
2003/0021038 A1 * 1/2003 Ota et al. ............... 359/718
2003/0193724 A1 * 10/2003 Sakamoto ............... 359/719

FOREIGN PATENT DOCUMENTS

JP       2001-305424       10/2001

* cited by examiner

Primary Examiner—Georgia Epps
Assistant Examiner—M. Hasan
(74) Attorney, Agent, or Firm—Finnegan, Henderson, Farabow, Garrett & Dunner, L.L.P.

(57) ABSTRACT

An objective lens for use in an optical pickup apparatus in which first and second light sources are provided on a same flat surface, converges each of the light fluxes from the first and second light sources onto an information recording plane through each of transparent substrates of a first and second optical information recording mediums and has a coma aberration of 0.015 $\lambda 1$ rms or less when recording or reproducing information is conducted for the first optical information recording medium, and a coma aberration of 0.015 $\lambda 2$ rms or less when recording or reproducing information is conducted for the second optical information recording medium.

62 Claims, 6 Drawing Sheets

SINE CONDITION

SINE CONDITION OFFENSE AMOUNT

SINE CONDITION OFFENSE AMOUNT

OBJECTIVE LENS FOR OPTICAL PICK-UP APPARATUS AND OPTICAL PICK-UP APPARATUS

BACKGROUND OF THE INVENTION

The present invention relates to an objective lens used for an optical pick-up apparatus and an optical pick-up apparatus, and particularly relates to an objective lens for conducting recording/reproducing of optical information recording media whose recording density is different, by one objective lens, and an optical pick-up apparatus.

In the present, many kinds of optical information recording media exist and the standard of these optical information recording media is decided as shown in [Table 1]. In this connection, hereinafter (including the lens data in the table), an exponent of 10 (for example, $2.5 \times 10^{-3}$) is expressed by E (for example, $2.5 \times E-3$).

TABLE 1

| optical disk | transparent substrate thickness (mm) | necessary numerical aperture (optical source wavelength λ nm) |
|---|---|---|
| CD, CD-R (reproduction) | 1.20 | 0.45 (λ = 780 nm) |
| CD-R (record, reproduction) | 1.20 | 0.50 (λ = 780 nm) |
| DVD | 0.60 | 0.60 (λ = 635 nm) |

Herein, as an example in which the interchangeability of mutual optical information recording media whose recording density is different is required, there is DVD and CD. In these optical information recording media, as shown in [Table 1], the transparent substrate thickness are respectively different. In order to secure the interchangeability, it is necessary that the spherical aberration generated by the difference of this transparent substrate thickness is corrected by any means. Further, in the DVD and CD, because the required numerical aperture is different, any countermeasure is necessary also for this.

In order to realize an optical pick-up apparatus having the interchangeability of the DVD/CD, an objective lens in which a diffractive structure is provided, is developed. As such an objective lens, there is an objective lens in which for example, on one side surface of the objective lens, the diffractive structure which is different in the inside and outside of a specific distance h from the optical axis is provided, and in the inside area, the spherical aberration is corrected for the respective transparent substrate thickness and in the outside area, the spherical aberration is corrected only for the DVD, and for the CD, the spherical aberration is not corrected, but flared. When the objective lens is structured in this manner, on each optical information recording medium, the light converging spot which is required at the time of record or reproduction of each information, can be adequately formed.

In this connection, by using such a diffractive structure for the objective lens, the correction of the spherical aberration when the recording or reproducing is carried out for both DVD/CD, can be carried out comparatively easily. However, as an optical characteristic deterioration factor by which the recording or reproducing of the adequate information is prevented, there is also a coma other than the spherical aberration. When the coma is large, by the inclination of the objective lens generated due to the assembling error, when the light flux inclined to the optical axis is incident, there is a possibility to prevent that the adequate spot is formed on the optical information recording medium. However, when the above-described diffractive structure is used, the spherical aberration at the time of use of both DVD/CD can be reduced together, but for the coma, there is a problem that both can not be simultaneously corrected.

As the light source of the optical pick-up apparatus specifically to attain the interchangeability of the DVD/CD, the light source in which 2 semiconductor lasers which are called so-called 2 laser 1 package are attached to one substrate and formed as one unit, is well known. By using such a light source, when the information is going to be recorded or reproduced onto both of DVD/CD, for example, when the light source for the DVD is arranged on the optical axis of the objective lens, the light source for the CD is arranged at the position shifted from the optical axis without fail, accordingly, in this case, it can be said to be preferable that the coma is extremely reduced at the time of the use of CD.

SUMMARY OF THE INVENTION

The present invention is attained in view of the above problems, and the object of the present invention is to provide the objective lens for the optical pick-up apparatus and the optical pick-up apparatus by which the coma can be corrected with the good balance, and the recording or reproducing of the information can be adequately carried out onto different optical information recording media.

DETAILED DESCRIPTION OF THE PREFERRED EMBODIMENT

Figure 1:
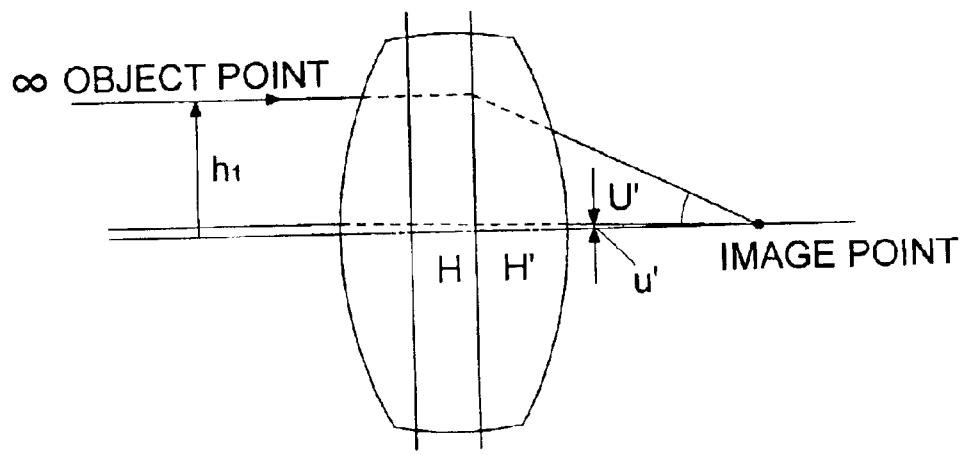
FIG. 1 is a view for explaining the sine condition.

Initially, a preferred structure of the present invention will be described. An objective lens of the optical pick-up apparatus described in the first aspect is the objective lens of the optical pick-up apparatus having: the first light source of the wavelength $\lambda 1$ by which the information is recorded or reproduced when the light flux is irradiated onto the first optical information recording medium whose thickness of transparent substrate is t1; the second light source of the wavelength $\lambda 2$ ($\lambda 1 < \lambda 2$) by which the information is recorded or reproduced when the light flux is irradiated onto the second optical information recording medium whose thickness of transparent substrate is t2 (t1<t2); and a light converging optical system including the objective lens to light converge the light flux emitted from the first and second light sources onto the information recording surface through the transparent substrate of the first and second optical information recording media, and the first light source and second light source are provided on a same flat surface, and the first light source is arranged almost on the optical axis, and the second light source is arranged at a position apart by a predetermined distance from the optical axis, and because the coma when the information is recorded and/or reproduced onto the first optical information recording medium, is not larger than 0.01 λ1 rms and the coma when the information is recorded and/or reproduced onto the second optical information recording medium, is not larger than 0.01 λ2 rms, even when the objective lens is inclined to the optical axis due to the assembling error, the recording or reproducing of the information can be adequately carried out also onto either optical information recording medium.

Here, "the same flat surfaces" may includes an error of several μm.

In the objective lens of the optical pick-up apparatus described in the second aspect, because the first light source and the second light source are formed into one unit, when the objective lens is used, the light source of so called 2 laser 1 package can be used, and the structure of the optical pick-up apparatus can be more simplified.

The optical pick-up apparatus described in the third aspect is an optical pick-up apparatus having: the first light source of the wavelength λ1 by which the information is recorded or reproduced when the light flux is irradiated onto the first optical information recording medium whose thickness of the transparent substrate is t1; the second light source of the wavelength λ2 (λ1<λ2) by which the information is recorded or reproduced when the light flux is irradiated onto the second optical information recording medium whose thickness of the transparent substrate is t2 (t1<t2); and the light converging optical system including the objective lens to light converge the light flux emitted from the first and second light sources onto the information recording surface through the transparent substrates of the first and second optical information recording media, the optical pick-up apparatus is characterized in that: the first light source and the second light source are mounted on a single substrate and the first light source is arranged on almost optical axis, and the second light source is arranged at a position apart by a predetermined distance from the optical axis; and in the objective lens, the coma when the information is recorded and/or reproduced onto the first optical information recording medium is not larger than 0.01 λ1 rms; and the coma when the information is recorded and/or reproduced onto the second optical information recording medium is not larger than 0.01 λ2 rms.

The optical pick-up apparatus described in the fourth aspect is characterized in that the first light source and the second light source are formed by one unit.

The objective lens of the optical pick-up apparatus described in the fifth aspect is an objective lens of the optical pick-up apparatus having: the first light source of the wavelength λ1 by which the information is recorded or reproduced when the light flux is irradiated onto the first optical information recording medium whose thickness of the transparent substrate is t1; the second light source of the wavelength λ2 (λ1<λ2) by which the information is recorded or reproduced when the light flux is irradiated onto the second optical information recording medium whose thickness of the transparent substrate is t2 (t1<t2); and the light converging optical system including the objective lens to light converge the light flux emitted from the first and second light sources onto the information recording surface through the transparent substrates of the first and second optical information recording media, the objective lens of the optical pick-up apparatus is characterized in that: it has an optical surface having a central optical function area including the optical axis, and an outside optical function area of the far side from the optical axis; the light flux passed the central optical function area is used for carrying out the recording and/or reproducing of the information onto both of the first optical information recording medium and the second optical information recording medium, and the light flux passed the outside optical function area is used for carrying out the recording and/or reproducing of the information onto only the first optical information recording medium; and in the central optical function area, the sine condition offense amount when the information is recorded and/or reproduced onto the first optical information recording medium by the light flux from the first light source is a positive value, and the sine condition offense amount when the information is recorded and/or reproduced onto the second optical information recording medium by the light flux from the second light source is a negative value; and when the information is recorded and/or reproduced onto the first optical information recording medium by the light flux from the first light source, the sine condition offense amount at the portion closest to the central optical function area in the outside optical function area is not larger than the sine condition offense amount at a portion closest to the outside optical function area in the central optical function area.

Herein, the sine condition means, as shown in FIG. 1, for example, when the light ray of the height $h_1$ from the optical axis is incident on the lens parallely to optical axis, and the projecting inclination angle in such the light ray is U', the lens design condition to reduce the coma given by $h_1$/sin U'=constant. The sine condition offense amount is an amount showing the degree separated from the sine condition, and for example, when the aspherical surface coefficient of the objective lens is changed, it can be adjusted to an arbitrary value (for example, zero). However, in the case where the information is recorded or reproduced onto the optical information recording media of the different substrate thickness, there is the characteristic of the antinomy in which, when the sine condition offense amount to one side optical information recording medium is suppressed to zero, the sine condition offense amount to the other optical information recording medium is largely separated from zero. In the present invention, in the case where the information is recorded or reproduced onto the second optical information recording medium by the light flux from the second light source, when the light flux passing the outside optical function area is made, for example, a flare light, because it is not used for recording and/or reproducing the information, even when the coma is generated in the light flux passing such the outside optical function area, there is specifically no problem. Accordingly, when the information is recorded and/or reproduced onto the first optical information recording medium by the light flux from the fist light source, for the outside optical function area, the sine condition offense amount can be arbitrarily decided. Therefore, when the sine condition offense amount (A) in a portion closest to the central optical function area in the outside optical function area is made smaller than the sine condition offense amount (B) in a portion closest to the outside optical function area in the central optical function area, the sine condition of the necessary numerical aperture to the first optical information recording medium is overall made small as compared to the case of not so (the case of A≧B), as the result, because the coma component of the wave front aberration in the case where it has the image height can be made smaller, the information can be adequately recorded or reproduced onto the first optical information recording medium.

The objective lens of the optical pick-up apparatus described in the six aspect is characterized in that: when the information is recorded and/or reproduced by the light flux from the first light source onto the first optical information recording medium, the sine condition offense amount in the outside optical function area is not continuous to the sine condition offense amount in the central optical function area. In order to make such a sine condition offense amount non-continuous, although it is considered that the aspherical surface coefficient to define the refractive surface of the central optical function area, and the aspherical surface coefficient to define the refractive surface of the outside optical function area is made different, it is not limited to that.

The objective lens of the optical pick-up apparatus described in the seventh aspect is characterized in that: in the central optical function area, the absolute value of the sine condition offense amount when the information is recorded and/or reproduced onto the first optical information recording medium by the light flux from the first light source, and the absolute value of the sine condition offense amount when the information is recorded and/or reproduced onto the second optical information recording medium by the light flux from the second light source are about equal. As described above, although the sine condition offense amount can be made an arbitrary value when, for example, the aspherical surface coefficient of the optical surface of the objective lens is changed, to both of the first and second optical information recording media, both of the sine condition offense amounts can not be made zero. Accordingly, for the central optical function area used also for when the information is recorded and/or reproduced onto any optical information recording medium, in the case where the absolute value of the sine condition offense amount when the information is recorded and/or reproduced onto the first optical information recording medium and the absolute value of the sine condition offense amount when the information is recorded and/or reproduced onto the second optical information recording medium are made equal, by approximating the coma amounts generated to the optical information recording media of the different substrate thickness to each other, the information can be made so as to be recorded or reproduced with good balance.

In the objective lens of the optical pick-up apparatus described in the eighth aspect, because the diffractive structure is provided in the central optical function area, the spherical aberration can be suppressed.

The objective lens of the optical pick-up apparatus described in the ninth aspect is characterized in that: the central optical function area is divided into a plurality of ring-shaped zones around the optical axis, and the mutual adjoining ring-shaped zones have the optical path difference providing function by which the optical path difference of almost integer times of a predetermined wavelength $\lambda s$ is generated.

In the objective lens of the optical pick-up apparatus described in the tenth aspect, because the diffractive structure is provided in the outside optical function area, the spherical aberration can be suppressed.

The objective lens of the optical pick-up apparatus described in the 11th aspect is characterized in that: the outside optical function area is divided into a plurality of ring-shaped zones around the optical axis, and the mutual adjoining ring-shaped zones have the optical path difference providing function by which the optical path difference of almost integer times of a predetermined wavelength $\lambda s$ is generated.

The optical pick-up apparatus described in the 12th aspect is an optical pick-up apparatus having: the first light source of the wavelength $\lambda 1$ by which the information is recorded or reproduced when the light flux is irradiated onto the first optical information recording medium whose thickness of the transparent substrate is t1; the second light source of the wavelength $\lambda 2$ ($\lambda 1 < \lambda 2$) by which the information is recorded or reproduced when the light flux is irradiated onto the second optical information recording medium whose thickness of the transparent substrate is t2 (t1<t2); and the light converging optical system including the objective lens to light converge the light flux emitted from the first and second light sources onto the information recording surface through the transparent substrates of the first and second optical information recording media, the optical pick-up apparatus is characterized in that: it has an optical surface having a central optical function area including the optical axis, and an outside optical function area of the far side from the optical axis; the light flux passed the central optical function area is used for carrying out the recording and/or reproducing of the information onto both of the first optical information recording medium and the second optical information recording medium, and the light flux passed the outside optical function area is used for carrying out the recording and/or reproducing of the information onto only the first optical information recording medium; and in the central optical function area, the sine condition offense amount when the information is recorded and/or reproduced onto the first optical information recording medium by the light flux from the first light source is a positive value, and the sine condition offense amount when the information is recorded and/or reproduced onto the second optical information recording medium by the light flux from the second light source is a negative value; and when the information is recorded and/or reproduced onto the first optical information recording medium by the light flux from the first light source, the sine condition offense amount at the portion closest to the central optical function area in the outside optical function area is not larger than the sine condition offense amount at a portion closest to the outside optical function area in the central optical function area.

The optical pick-up apparatus described in the 13th aspect is characterized in that: in the objective lens, when the information is recorded and/or reproduced onto the first optical information recording medium by the light flux from the first light source, the sine condition offense amount in the outside optical function area is not continuous to the sine condition offense amount in the central optical function area.

The optical pick-up apparatus described in the 14th aspect is characterized in that: in the central optical function area in the objective lens, an absolute value of the sine condition offense amount when the information is recorded and/or reproduced onto the first optical information recording medium by the light flux from the first light source, and the absolute value of the sine condition offense amount when the information is recorded and/or reproduced onto the second optical information recording medium by the light flux from the second light source are almost equal.

The optical pick-up apparatus described in the 15th aspect is characterized in that: the diffractive structure is provided in the central optical function area of the objective lens.

The optical pick-up apparatus described in the 16th aspect is characterized in that: the central optical function area of the objective lens is divided into a plurality of ring-shaped zones around the optical axis, and mutual adjoining ring-shaped zones have the optical path difference providing function by which the optical path difference of about integer times of the predetermined wavelength $\lambda s$ is generated.

The optical pick-up apparatus described in the 17th aspect is characterized in that: the diffractive structure is provided in the outside optical function area of the objective lens.

The optical pick-up apparatus described in the 18th aspect is characterized in that: the outside optical function area of the objective lens is divided into a plurality of ring-shaped zones around the optical axis, and mutual adjoining ring-shaped zones have the optical path difference providing function by which the optical path difference of about integer times of the predetermined wavelength $\lambda s$ is generated.

The objective lens of the optical pick-up apparatus described in the 19th aspect is an objective lens of the optical pick-up apparatus having: the first light source of the wavelength $\lambda 1$ by which the information is recorded or reproduced when the light flux is irradiated onto the first optical information recording medium whose thickness of the transparent substrate is t1; the second light source of the wavelength $\lambda 2$ ($\lambda 1 < \lambda 2$) by which the information is recorded or reproduced when the light flux is irradiated onto the second optical information recording medium whose thickness of the transparent substrate is t2 (t1<t2); and the light converging optical system including the objective lens to light converge the light flux emitted from the first and second light sources onto the information recording surface through the transparent substrates of the first and second optical information recording media, and the first light source and the second light source are mounted in one substrate, the first light source is arranged on almost the optical axis, and the second light source is arranged at a position separated by a predetermined distance from the optical axis, the objective lens of the optical pick-up apparatus is characterized in that: it has an optical surface having a central optical function area including the optical axis, and an outside optical function area of the far side from the optical axis; the light flux passed the central optical function area is used for carrying out the recording and/or reproducing of the information onto both of the first optical information recording medium and the second optical information recording medium, and the light flux passed the outside optical function area is used for carrying out the recording and/or reproducing of the information onto only the first optical information recording medium; and in the central optical function area, the sine condition offense amount when the information is recorded and/or reproduced onto the first optical information recording medium by the light flux from the first light source is a positive value, and the sine condition offense amount when the information is recorded and/or reproduced onto the second optical information recording medium by the light flux from the second light source is a negative value; and when the information is recorded and/or reproduced onto the first optical information recording medium by the light flux from the first light source, the sine condition offense amount at the portion closest to the central optical function area in the outside optical function area is not larger than the sine condition offense amount at a portion closest to the outside optical function area in the central optical function area; and because the coma when the information is recorded and/or reproduced onto the first optical information recording medium is not larger than 0.01 $\lambda 1$ rms, and the coma when the information is recorded and/or reproduced onto the second optical information recording medium is not larger than 0.01 $\lambda 2$ rms, even when the objective lens is inclined to the optical axis due to the assembling error, the recording or reproducing of the information can be adequately carried out also onto any optical information recording medium.

The objective lens of the optical pick-up apparatus described in the 20th aspect is characterized in that: the first light source and the second light source are formed by one unit.

The objective lens of the optical pick-up apparatus described in the 21th aspect is characterized in that: when the information is recorded and/or reproduced by the light flux from the first light source onto the first optical information recording medium, the sine condition offense amount in the outside optical function area is not continuous to the sine condition offense amount in the central optical function area.

The objective lens of the optical pick-up apparatus described in the 22th aspect is characterized in that: in the central optical function area, the absolute value of the sine condition offense amount when the information is recorded and/or reproduced by the light flux from the first light source onto the first optical information recording medium, and the absolute value of the sine condition offense amount when the information is recorded and/or reproduced by the light flux from the second light source onto the second optical information recording medium, are almost equal.

The objective lens of the optical pick-up apparatus described in the 23th aspect is characterized in that: the diffractive structure is provided in the central optical function area.

The objective lens of the optical pick-up apparatus described in the 24th aspect is characterized in that: the central optical function area is divided into a plurality of ring-shaped zones around the optical axis, and mutual adjoining ring-shaped zones have the optical path difference providing function by which the optical path difference of about integer times of a predetermined wavelength $\lambda s$ is generated.

The objective lens of the optical pick-up apparatus described in the 25th aspect is characterized in that: the diffractive structure is provided in the outside optical function area.

The objective lens of the optical pick-up apparatus described in the 26th aspect is characterized in that: the outside optical function area is divided into a plurality of ring-shaped zones around the optical axis, and mutual adjoining ring-shaped zones have the optical path difference providing function by which the optical path difference of about integer times of a predetermined wavelength $\lambda s$ is generated.

The optical pick-up apparatus described in the 27th aspect is an optical pick-up apparatus having: the first light source of the wavelength $\lambda 1$ by which the information is recorded or reproduced when the light flux is irradiated onto the first optical information recording medium whose thickness of the transparent substrate is t1; the second light source of the wavelength $\lambda 2$ ($\lambda 1 < \lambda 2$) by which the information is recorded or reproduced when the light flux is irradiated onto the second optical information recording medium whose thickness of the transparent substrate is t2 (t1<t2); and the light converging optical system including the objective lens to light converge the light flux emitted from the first and second light sources onto the information recording surface through the transparent substrates of the first and second optical information recording media, and the first light source and the second light source are mounted on one substrate, the first light source is arranged on almost the optical axis, and the second light source is arranged at a position separated by a predetermined distance from the optical axis, the optical pick-up apparatus is characterized in that: in the objective lens, it has an optical surface having a central optical function area including the optical axis, and an outside optical function area of the far side from the optical axis; the light flux passed the central optical function area is used for carrying out the recording and/or reproducing of the information onto both of the first optical information recording medium and the second optical information recording medium, and the light flux passed the outside optical function area is used for carrying out the recording and/or reproducing of the information onto only the first optical information recording medium; and in the central optical function area, the sine condition offense amount when the information is recorded and/or reproduced onto the first optical information recording medium by the light flux from the first light source is a positive value, and the sine condition offense amount when the information is recorded and/or reproduced onto the second optical information recording medium by the light flux from the second light source is a negative value; and when the information is recorded and/or reproduced onto the first optical information recording medium by the light flux from the first light source, the sine condition offense amount at the portion closest to the central optical function area in the outside optical function area is not larger than the sine condition offense amount at a portion closest to the outside optical function area in the central optical function area; and the coma when the information is recorded and/or reproduced onto the first-optical information recording medium is not larger than 0.01 $\lambda 1$ rms, and the coma when the information is recorded and/or reproduced onto the second optical information recording medium is not larger than 0.01 $\lambda 2$ rms.

The optical pick-up apparatus described in the 28th aspect is characterized in that: the first light source and the second light source are formed by one unit.

The optical pick-up apparatus described in the 29th aspect is characterized in that: in the objective lens, when the information is recorded and/or reproduced onto the first optical information recording medium by the light flux from the first light source, the sine condition offense amount in the outside optical function area is not continuous to the sine condition offense amount in the central optical function area.

The optical pick-up apparatus described in the 30th aspect is characterized in that: in the central optical function area of the objective lens, the absolute value of the sine condition offense amount when the information is recorded and/or reproduced onto the first optical information recording medium by the light flux from the first light source, and the absolute value of the sine condition offense amount when the information is recorded and/or reproduced onto the second optical information recording medium by the light flux from the second light source, are almost equal.

The optical pick-up apparatus described in the 31th aspect is characterized in that: the diffractive structure is provided in the central optical function area of the objective lens.

The optical pick-up apparatus described in the 32th aspect is characterized in that: the central optical function area of the objective lens is divided into a plurality of ring-shaped zones around the optical axis, and mutual adjoining ring-shaped zones have the optical path difference providing function by which the optical path difference of about integer times of a predetermined wavelength $\lambda s$ is generated.

The optical pick-up apparatus described in the 33th aspect is characterized in that: the diffractive structure is provided in the outside optical function area of the objective lens.

The optical pick-up apparatus described in the 34th aspect is characterized in that: the outside optical function area of the objective lens is divided into a plurality of ring-shaped zones around the optical axis, and mutual adjoining ring-shaped zones have the optical path difference providing function by which the optical path difference of about integer times of a predetermined wavelength $\lambda s$ is generated.

The objective lens of the optical pick-up apparatus described in the 35th aspect is an objective lens of the optical pick-up apparatus having: the first light source of the wavelength $\lambda 1$ by which the information is recorded or reproduced when the light flux is irradiated onto the first optical information recording medium whose thickness of the transparent substrate is t1; the second light source of the wavelength $\lambda 2$ ($\lambda 1 < \lambda 2$) by which the information is recorded or reproduced when the light flux is irradiated onto the second optical information recording medium whose thickness of the transparent substrate is t2 (t1<t2); and the light converging optical system including the objective lens to light converge the light flux emitted from the first and second light sources onto the information recording surface through the transparent substrates of the first and second optical information recording media, and onto the first and second optical information recording media, the light fluxes from the first and the second light sources are converged, and the optical pick-up apparatus has an inclination providing optical element by which at least one side of the light flux from the first light source and the light flux from the second light source in the light flux incident on the objective lens, is divided into the central light flux converged onto the corresponding optical information recording medium along the optical axis, and the peripheral light flux converged onto the corresponding optical information recording medium being inclined outside the optical axis, the central light receiving member by which the central light flux is received, and the peripheral light receiving member by which the peripheral light flux is received, the objective lens of the optical pick-up apparatus is characterized in that: in the objective lens, it has an optical surface having a central optical function area including the optical axis, and an outside optical function area of the far side from the optical axis; the light flux passed the central optical function area is used for carrying out the recording and/or reproducing of the information onto both of the first optical information recording medium and the second optical information recording medium, and the light flux passed the outside optical function area is used for carrying out the recording and/or reproducing of the information onto only the first optical information recording medium; and in the central optical function area, the sine condition offense amount when the information is recorded and/or reproduced onto the first optical information recording medium by the light flux from the first light source is a positive value, and the sine condition offense amount when the information is recorded and/or reproduced onto the second optical information recording medium by the light flux from the second light source is a negative value; and when the information is recorded and/or reproduced onto the first optical information recording medium by the light flux from the first light source, the sine condition offense amount at the portion closest to the central optical function area in the outside optical function area is not larger than the sine condition offense amount at a portion closest to the outside optical function area in the central optical function area.

Figure 2:
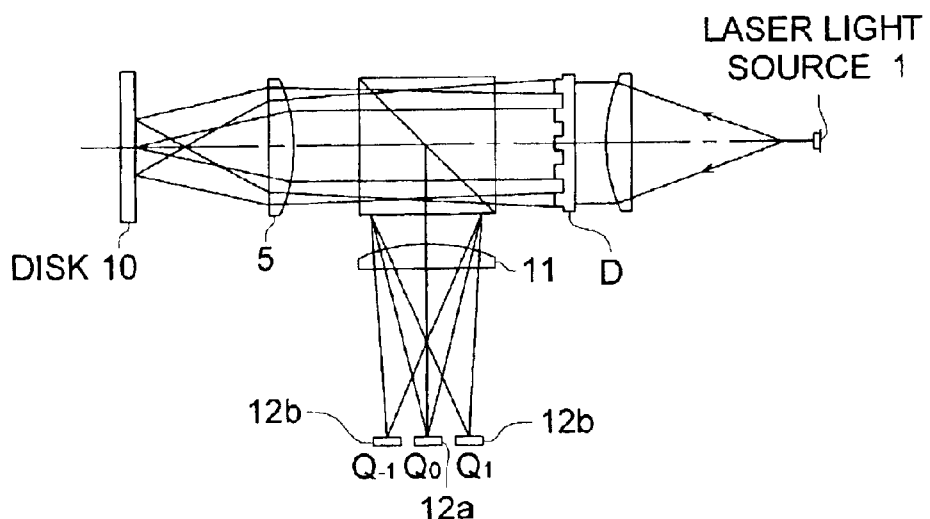
FIGS. 2(a) to 2(c) each is a view for explaining an operation of a light detector.
Figure 2:
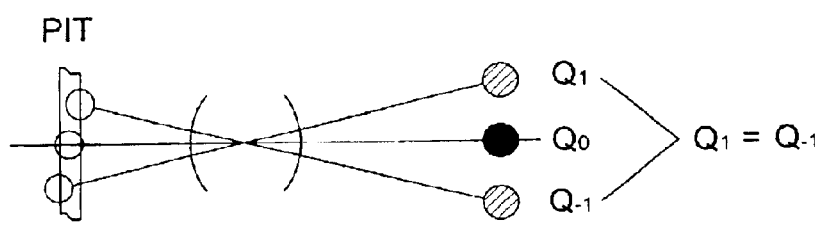
Figure 2:
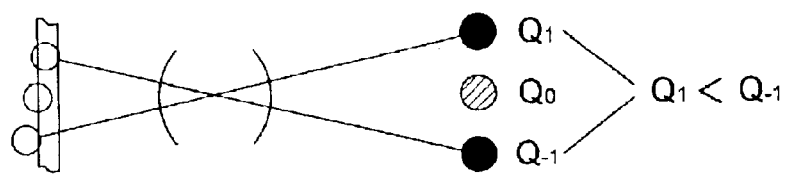

A principle of the present invention will be described below. FIG. 2 is a view for explaining the operation of a light detector, and FIG. 2(a) is an outline view showing one example of the optical pick-up apparatus and FIGS. 2(b) and (c) are views showing a light receiving condition of a light receiving member.

In the optical pick-up apparatus, so called tracking servo operation by which a spot image follows a pit (small area in which the information is written) oscillating on the rotating optical information recording medium (disk) 10, and the spot image through the objective lens 5 is positioned on the central axis of the pit, is carried out. As one of the tracking servo system, as shown in FIG. 2(a), when the diffraction grating D is placed on the optical path of a laser light incident on an objective lens 5, the laser light irradiated from a light source 1 is diffracted, and separated in 0-order and ±1-order directions.

Figure 3:
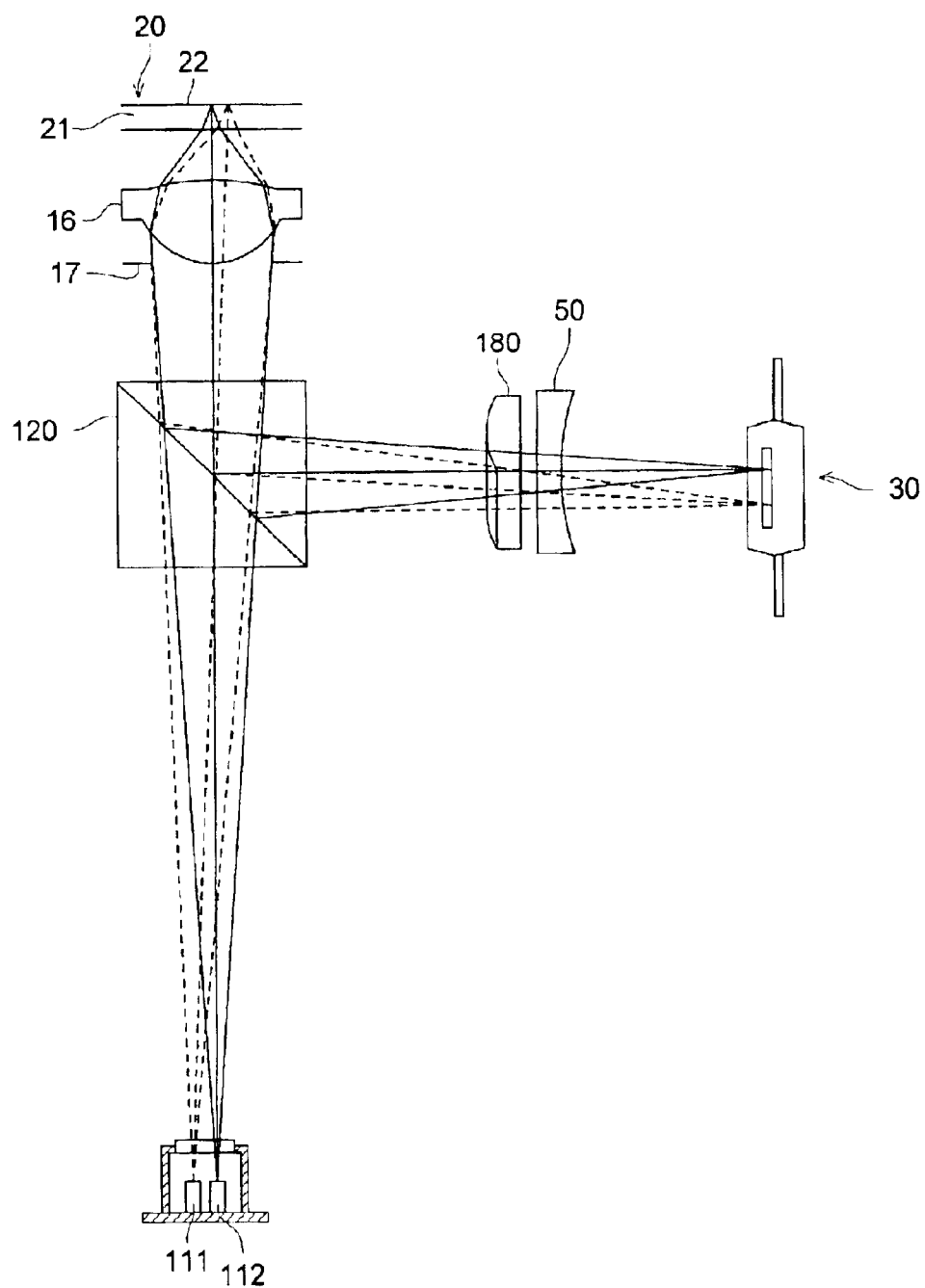
FIG. 3 is an outline structural view of an optical pick-up apparatus according to the present embodiment.

Herein, in the diffraction grating D which functions as an inclination providing element, when the distance between the gratings (grating constant) is d, and the light source wavelength is λ, the diffraction angle θ of the ±1-order light is expressed as $\theta = \pm \lambda/d$. These diffraction lights are converged by the objective lens 5, and as shown in FIG. 2(a), 3 spot images of 0-order and ±1-order are generated, and when the interval is t, and the focal distance of the objective lens 5 is f, the expression $t = f\theta = \pm f \cdot \lambda/d$ is expressed.

In this manner, 3 spot images are made in such a manner that, as shown in FIG. 2(b), 0-order light is positioned on the central axis of the pit, and ±1-order light is positioned on the edge of the pit, and the returning light by the diffraction of these lights is image formed again by the objective lens 5, and at the position of each image point, a central light receiving member 12a of a light detector 12 and a peripheral light receiving member 12b are positioned. When the pit is correctly positioned, as shown in FIG. 2(b), the light amount $Q_1$ and $Q_{-1}$ of the light which is received by a pair of peripheral light receiving members 12b are principally equal. However, for example, when the pit is shifted as shown in FIG. 2(C), the light amount $Q_{-1}$ is higher than the light amount $Q_1$ and according to this difference, because the shift amount of the pit is found, by using the feedback control, the servo of the tracking can be carried out.

Because the above-described light detector is a light detector by which principally the light ray is branched outside the optical axis and the accuracy of the tracking is raised, when looked relatively, the objective lens is inclined to any of light flux, and the coma is generated. When the coma is large herein, the object to increase the accuracy of the tracking can not be attained.

In contrast to this, according to the present invention, when the information is recorded and/or reproduced onto the first optical information recording medium for which generally the high accurate detection of the tracking error is required, it is possible that, when the generation of the coma in the light flux onto the peripheral light receiving member on which the light flux is incident being inclined to the optical axis of the objective lens, is suppressed by arbitrarily setting the sine condition offense amount relating to the outside optical function area, and the detection of the tracking error is high accurately carried out.

In the objective lens of the optical pick-up apparatus described in 36th aspect, because the inclination providing optical element divides the light flux used when the information is recorded and/or reproduced onto the first optical information recording medium, when the information is recorded or reproduced onto the first optical information recording medium, the detection of the tracking error can be adequately carried out.

In the objective lens of the optical pick-up apparatus described in 37th aspect, because the inclination providing optical element divides the light flux used when the information is recorded and/or reproduced onto the second optical information recording medium, when the information is recorded or reproduced onto the second optical information recording medium, the detection of the tracking error can be adequately carried out.

The optical pick-up apparatus described in the 38th aspect is an optical pick-up apparatus having: the first light source of the wavelength λ1 by which the information is recorded or reproduced when the light flux is irradiated onto the first optical information recording medium whose thickness of the transparent substrate is t1; the second light source of the wavelength λ2 (λ1<λ2) by which the information is recorded or reproduced when the light flux is irradiated onto the second optical information recording medium whose thickness of the transparent substrate is t2 (t1<t2); and the light converging optical system including the objective lens to light converge the light flux emitted from the first and second light sources onto the information recording surface through the transparent substrates of the first and second optical information recording media, and the objective lens converges the light fluxes from the first and the second light sources onto the first and second optical information recording media, and the optical pick-up apparatus has an inclination providing optical element by which at least one side of the light flux from the first light source and the light flux from the second light source in the light flux incident on the objective lens, is divided into the central light flux converged onto the corresponding optical information recording medium along the optical axis, and the peripheral light flux converged onto the corresponding optical information recording medium being inclined outside the optical axis, the central light receiving member by which the central light flux is received, and the peripheral light receiving member by which the peripheral light flux is received, the optical pick-up apparatus is characterized in that: in the objective lens, it has an optical surface having a central optical function area including the optical axis, and an outside optical function area of the far side from the optical axis; the light flux passed the central optical function area is used for carrying out the recording and/or reproducing of the information onto both of the first optical information recording medium and the second optical information recording medium, and the light flux passed the outside optical function area is used for carrying out the recording and/or reproducing of the information onto only the first optical information recording medium; and in the central optical function area, the sine condition offense amount when the information is recorded and/or reproduced onto the first optical information recording medium by the light flux from the first light source is a positive value, and the sine condition offense amount when the information is recorded and/or reproduced onto the second optical information recording medium by the light flux from the second light source is a negative value; and when the information is recorded and/or reproduced onto the first optical information recording medium by the light flux from the first light source, the sine condition offense amount at the portion closest to the central optical function area in the outside optical function area is not larger than the sine condition offense amount at a portion closest to the outside optical function area in the central optical function area.

The optical pick-up apparatus described in the 39th aspect is characterized in that: the inclination providing optical element divides the light flux used when the information is recorded and/or reproduced onto the first optical information recording medium.

The optical pick-up apparatus described in the 39th aspect is characterized in that: the inclination providing optical element divides the light flux used when the information is recorded and/or reproduced onto the second optical information recording medium.

The objective lens of the optical pick-up apparatus described in the 41th aspect is an objective lens of the optical pick-up apparatus having: the first light source of the wavelength $\lambda 1$ by which the information is recorded or reproduced when the light flux is irradiated onto the first optical information recording medium whose thickness of the transparent substrate is t1; the second light source of the wavelength $\lambda 2$ ($\lambda 1 < \lambda 2$) by which the information is recorded or reproduced when the light flux is irradiated onto the second optical information recording medium whose thickness of the transparent substrate is t2 (t1<t2); and the light converging optical system including the objective lens to light converge the light flux emitted from the first and second light sources onto the information recording surface through the transparent substrates of the first and second optical information recording media, the objective lens of the optical pick-up apparatus is characterized in that: in the optical surface on the light source side of the objective lens, it has the central optical function area including the optical axis, and the outside optical function area of the far side from the optical axis, and in the central optical function area and the outside optical function area, respectively the diffractive structures are formed; and the light flux passed the central optical function area is used for carrying out the recording and/or reproducing of the information onto both of the first optical information recording medium and the second optical information recording medium, and the light flux passed the outside optical function area is used for carrying out the recording and/or reproducing of the information onto only the first optical information recording medium; and in the optical surface on the optical information recording medium side of the objective lens, it has the central optical function area including the optical axis, and the outside optical function area of the far side from the optical axis; in the central optical function area and the outside optical function area, the refractive surfaces which are defined by aspherical surface coefficients different from each other, are respectively formed; and the light flux passed the central optical function area is used for carrying out the recording and/or reproducing of the information onto both of the first optical information recording medium and the second optical information recording medium, and the light flux passed the outside optical function area is used for carrying out the recording and/or reproducing of the information onto only the first optical information recording medium.

As described above, in the objective lens, principally, the spherical aberration is corrected by using the diffractive structure, and by appropriately setting the aspherical surface coefficient to define the refractive surface, the sine condition offense amount is adjusted, and the coma can be corrected. However, practically, it is difficult that the design work is carried out so that the optimum sine condition offense amount can be obtained. Therefore, in the present invention, on the optical surface on the optical information recording medium side of the objective lens, when the refractive surfaces defined by the aspherical surface coefficients which are different from each other are formed in the central optical function area and the outside optical function area, the optimum sine condition offense amount can be easily obtained. In this connection, when the diffractive structure is provided on the optical information recording medium side of the objective lens, on the optical surface on the light source side of the objective lens, it may also be possible that the refractive surfaces defined by the aspherical surface coefficients which are respectively different from each other are formed in the central optical function area and the outside optical function area.

The optical pick-up apparatus described in the 42th aspect is an optical pick-up apparatus having: the first light source of the wavelength $\lambda 1$ by which the information is recorded or reproduced when the light flux is irradiated onto the first optical information recording medium whose thickness of the transparent substrate is t1; the second light source of the wavelength $\lambda 2$ ($\lambda 1 < \lambda 2$) by which the information is recorded or reproduced when the light flux is irradiated onto the second optical information recording medium whose thickness of the transparent substrate is t2 (t1<t2); and the light converging optical system including the objective lens to light converge the light flux emitted from the first and second light sources onto the information recording surface through the transparent substrates of the first and second optical information recording media, the optical pick-up apparatus is characterized in that: in the optical surface on the light source side of the objective lens, it has the central optical function area including the optical axis, and the outside optical function area of the far side from the optical axis; and in the central optical function area and the outside optical function area, respectively the diffractive structures are formed; the light flux passed the central optical function area is used for carrying out the recording and/or reproducing of the information onto both of the first optical information recording medium and the second optical information recording medium, and the light flux passed the outside optical function area is used for carrying out the recording and/or reproducing of the information onto only the first optical information recording medium; and in the optical surface on the optical information recording medium side of the objective lens, it has the central optical function area including the optical axis, and the outside optical function area of the far side from the optical axis; in the central optical function area and the outside optical function area, the refractive surfaces which are defined by aspherical surface coefficients different from each other, are respectively formed; and the light flux passed the central optical function area is used for carrying out the recording and/or reproducing of the information onto both of the first optical information recording medium and the second optical information recording medium, and the light flux passed the outside optical function area is used for carrying out the recording and/or reproducing of the information onto only the first optical information recording medium.

The "diffractive structure" used in the present specification means a portion in which a relief is provided on the surface of the objective lens, and on which a function to converge or diverge the light flux by the diffraction is provided. As the shape of the relief, for example, on the surface of the objective lens, it is formed as almost concentric circular ring-shaped zone around the optical axis, and when viewed its cross section in the plane including the optical axis, it is well known that the each ring-shaped zone is saw-toothed shape, and such the shape is included, and such the shape is specifically called "diffractive ring-shaped zone".

In the present specification, the objective lens means, in the narrow meaning, in the situation that the optical information recording medium is loaded in the optical pick-up apparatus, a lens which is arranged at the position closest to the optical information recording medium side in opposite to it, and has a light converging function, and in the wide meaning, together with the lens, means a lens group which can move at least in the optical axis direction by the actuator.

Herein, such the lens group means at least one or more sheets (for example, 2 sheets) of lenses. Accordingly, in the present specification, the numerical aperture NA of the optical information recording medium side (image side) means the numerical aperture NA of the lens surface positioned at the most optical information recording medium side of the objective lens. Further, in the present specification, the necessary numerical aperture NA means the numerical aperture regulated by the regulation of the respective optical information recording medium, or onto the respective optical information recording media, corresponding to the wavelength of the used light source, the numerical aperture of the objective lens of the diffraction limit performance by which the spot diameter necessary for the recording or reproducing of the information can be obtained.

In the present specification, the second optical information recording medium means, for example, the optical disks of each kind of CDs such as CD-R, CD-RW, CD-Video, or CD-ROM, and the first optical information recording medium means the optical disks of each kind of DVDs such as DVD-ROM, DVD-RAM, DVD-R, DVD-RW, or DVD-Video. Furthermore, in the present specification, the thickness t of the transparent substrate includes t=0.

Referring to the drawing, the present invention will be more detailed below. In FIG. 3, in the optical pick-up apparatus (including 2 laser 1 package type light source) according to the present embodiment, the first semiconductor laser 111 as the first light source, and the semiconductor laser 112 as the second light source are attached on the same substrate perpendicular to the optical axis, and structured as 1 unit. The beam emitted from the first semiconductor laser 111 (the wavelength λ1=610 nm–670 nm) transmits the beam splitter 120 which is light wave-compound means, further, stopped down by the diaphragm 17, and light converged onto the information recording surface 22 through the transparent substrate 21 of the first optical disk 20 by the objective lens 16.

Then, the light flux modulated by the information pit and reflected on the information recording surface 22 transmits again the objective lens 16, diaphragm 17, and is incident on the beam splitter 12, and reflected herein, and the astigmatism is given by the cylindrical lens 180, and the light flux is incident on the light detector 301 through the concave lens 50, and by using its output signal, the reading signal of the information which is information-recorded onto the first optical disk 20, can be obtained.

Further, the shape change of the spot on the light detector 301, and the light amount change by the position change are detected, and focusing detection and track detection are carried out. According to this detection, the 2 dimensional actuator (not shown) moves the objective lens 16 so that the light flux from the first semiconductor laser 111 is image formed on the recording surface of the first optical disk 20, and together with this, moves the objective lens 16 so that the light flux from the semiconductor laser 111 is image formed on a predetermined track.

The beam emitted from the second semiconductor laser 112 (the wavelength λ1=740 nm–870 nm) transmits the beam splitter 120 which is light wave-compound means, and further through diaphragm 17, and objective lens 16, it is light converged onto the information recording surface 22 through the transparent substrate 21 of the second optical disk 20.

Then, the light flux modulated by the information pit and reflected on the information recording surface 22 is reflected again on the objective lens 16, diaphragm 17, and beam splitter 120, and is given the astigmatism by the cylindrical lens 180, and is incident on the light detector 301 through the concave lens 50, and by using its output signal, the reading signal of the information which is recorded in the second optical disk 20, can be obtained.

Further, it is structured in such a manner that the shape change of the spot on the light detector 302 and the light amount change by the position change are detected, and by the 2 dimensional actuator (not shown), the objective lens 16 is moved for the focusing and tracking.

The preferred example of the above embodiment will be described below. Both surfaces of the objective lens are aspherical surfaces shown by [Formula 1]. Herein, Z is an axis in the optical axis direction, h is the axis in the perpendicular direction to the optical axis, r is the paraxial radius of curvature, κ is a conical coefficient, A is an aspherical surface coefficient, and P is the exponent of the aspherical surface.

[Formula 1]

$$\Phi = \sum_{i=1}^{\infty} c_i h^{2i} \text{ (mm)}$$

Further, the diffractive structure is integrally formed on the surface of the aspherical surface of the light source side of the objective lens. This diffractive structure is expressed by [Formula 2] in the unit of mm by the optical path difference function Φ to the blazed wavelength λB. This secondary coefficient expresses the paraxial power of the diffraction portion. Further, the spherical aberration can be controlled by the coefficient other than secondary order, for example, 4th-order, or 6th-order coefficient. Herein, "can be controlled" means that the spherical aberration which the refractive portion has is corrected as a total by providing the inverse characteristic spherical aberration at the diffraction portion, or by operating the spherical aberration of the diffraction portion, the total spherical aberration is made to a desired flare amount. In this case, the spherical aberration at the time of the temperature change can also be considered as the total of the temperature change of the spherical aberration of the refractive portion and the spherical aberration change of the diffraction portion.

[Formula 2]

$$Z = \frac{\frac{C^2}{R_0}}{1 + \sqrt{1 - (1+\kappa)\left(\frac{C}{R_0}\right)^2}} + \sum_{i=0}^{\infty} A_{2i} h^{2i}$$

EXAMPLE

Figure 5:
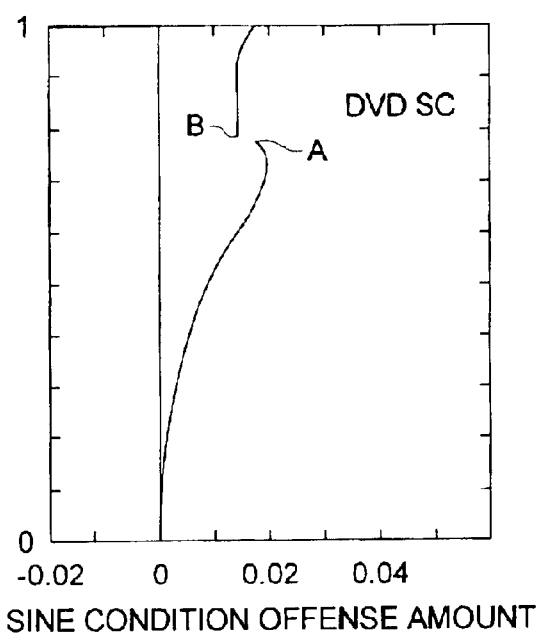
FIGS. 5(a) and 5(b) is a view showing a sine condition offense amount of the objective lens according to the example.
Figure 5:
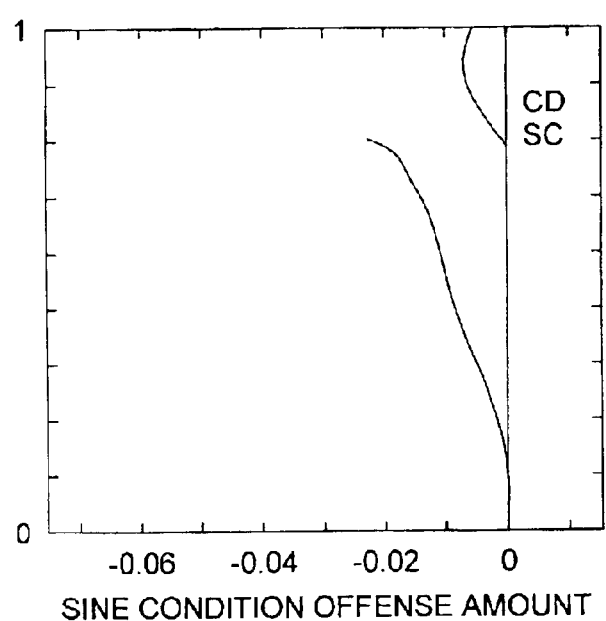
Figure 6:
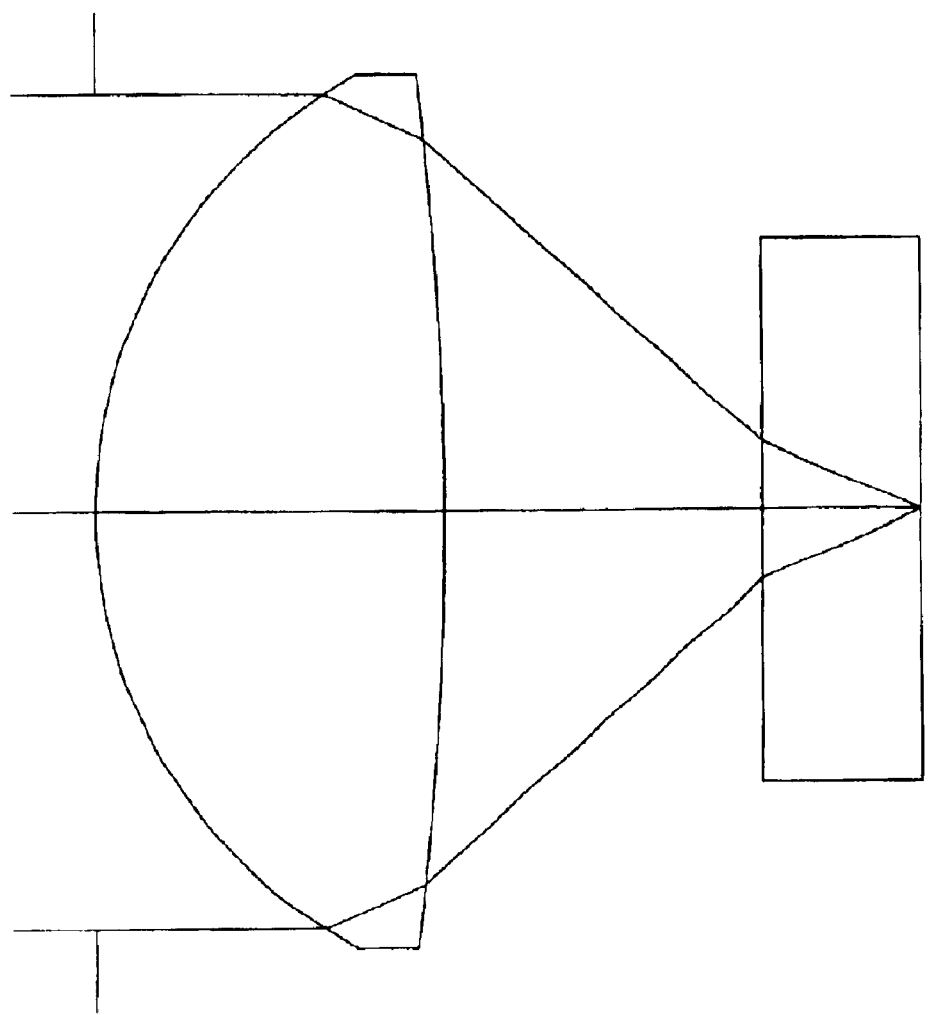
FIG. 6 is a sectional view of the objective lens according to the present example.

In the present example, on the light source side of the objective lens, the central optical function area provided with the diffractive structure and the outside optical function area provided with the diffractive structure are formed. In Table 2, the lens data of the objective lens according to the present example is shown. Further, in FIG. 4, the spherical aberration views (shown by the vertical spherical aberration amount) according to the objective lens of the present example, are respectively shown for DVD and CD. In FIG. 5, the sine condition offense amounts according to the objective lens of the present example, are respectively shown for DVD and CD. In FIG. 6, the sectional view of the objective lens according to the present example is shown.

TABLE 2

The 1st surface (0 < h < 1.181 : common use area of DVD/CD) aspherical surface coefficient

| | $R_0 = 1.45483$, | central thickness 1.33 |
|---|---|---|
| K | −2.9050 E + 00 | |
| A2 | 0.0000 E + 00 | |
| A4 | 8.7788 E − 02 | |
| A6 | −2.8206 E − 02 | |
| A8 | 1.3792 E − 02 | |
| A10 | −6.4865 E − 03 | |
| A12 | 3.3167 E − 03 | |
| A14 | −1.1835 E − 03 | |

Optical path difference function (coefficient of the optical path difference function) $\lambda B = 690$ nm

| C2 | −5.0497 E − 03 |
|---|---|
| C4 | −2.9530 E − 04 |
| C6 | −9.0245 E − 05 |
| C8 | −1.9675 E − 04 |

The 1' surface (1.181 ≦ h: DVD exclusive use area) aspherical surface coefficient

| | $R_0 = 1.81448$ | $\lambda_B = 660$ nm |
|---|---|---|
| K | −1.2095 E + 00 | |
| A0 | 0.018301 | |
| A2 | 0.0000 E + 00 | |
| A4 | 9.1722 E − 02 | |
| A6 | −2.6418 E − 02 | |
| A8 | 4.1251 E − 03 | |
| A10 | −2.1477 E − 03 | |
| A12 | 1.6812 E − 03 | |
| A14 | −3.7509 E − 04 | |

Optical path difference function (coefficient of optical path difference function)

| C2 | −7.9887 E − 03 |
|---|---|
| C4 | 5.4259 E − 03 |
| C6 | −3.2567 E − 03 |
| C8 | 9.6005 E − 05 |
| C10 | 1.0036 E − 04 |

When λ = 660 nm, f = 2.30 mm, NA 0.65, substrate thickness 0.60 mm.
When λ = 785 nm, f = 2.31 mm, NA 0.51, substrate thickness 1.20 mm.

Refractive index data

| λ | Objective lens | Substrate |
|---|---|---|
| 660 | 1.53956 | 1.57718 |
| 785 | 1.53596 | 1.57063 |

The 2nd surface (0 < h : 1.181: DVD/CD common use area) aspherical surface coefficient

| | $R_0 = -5.73780$ |
|---|---|
| K | −6.240217 |
| A4 | 0.380874 E − 01 |
| A6 | −0.873807 E − 02 |
| A8 | 0.124413 E − 01 |
| A10 | −0.194415 E − 01 |
| A12 | 0.102651 E − 01 |
| A14 | −0.362752 E − 02 |

The 2' surface (1.181 ≦ h : DVD/CD exclusive use area) aspherical surface coefficient

| | $R_0 = -6.10384$ |
|---|---|
| K | 13.819858 |
| A0 | −0.001672 |
| A4 | 0.384844 E − 01 |

TABLE 2-continued

| A6 | −0.197310 E − 01 |
|---|---|
| A8 | 0.316914 E − 02 |
| A10 | 0.214569 E − 02 |
| A12 | −0.133424 E − 02 |
| A14 | 0.199805 E − 03 |

Figure 4:
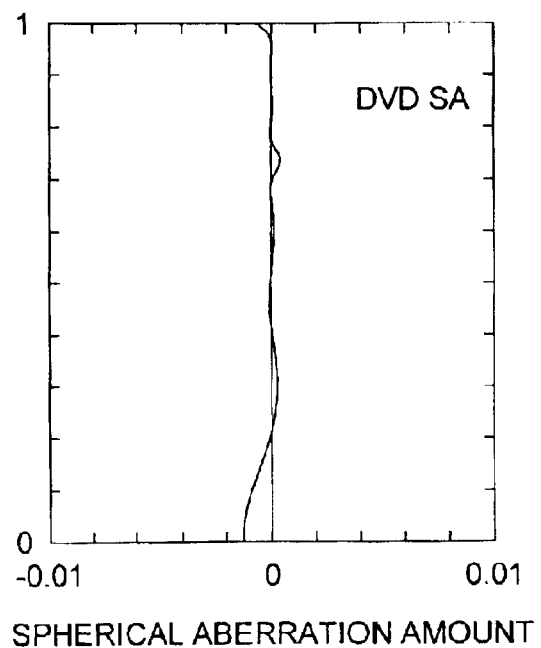
FIGS. 4(a) and 4(b) each is a view of spherical aberration of an objective lens according to an example.
Figure 4:
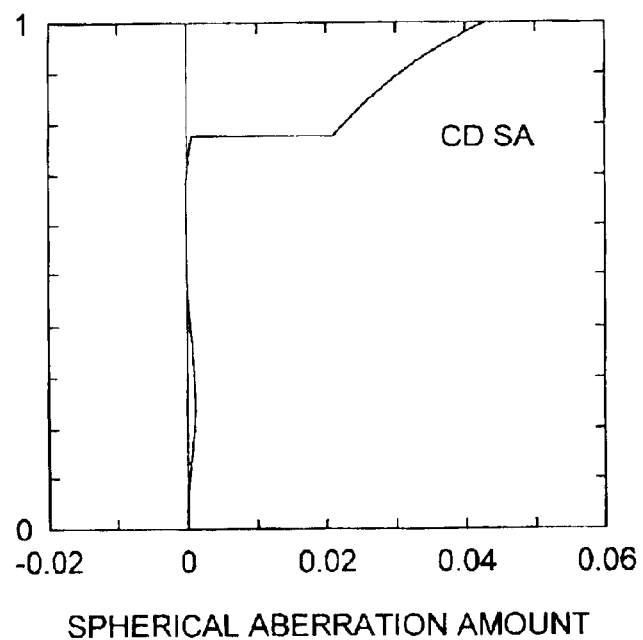

By the diffractive structure of the central optical function area and the outside optical function area provided on the light source side of the objective lens, as shown in FIG. 4, because, at the time of use of DVD, the spherical aberration is suppressed well, and at the time of use of CD, the spherical aberration amount of the light flux which passed the outside optical function area is increased, such the light flux is made a flare light, and made so that it does not participate in the recording or reproducing of the information. Further, when the coefficients to define the aspherical surface of the central optical function area and the outside optical function area provided on the disk side of the objective lens are made different, as shown in FIG. 5, the sine condition offense amounts in respective optical function areas are made non-continuous, and when DVD is used, the sine condition offense amount in the portion (A) closest to the central optical function area in the outside optical function area is made smaller than the sine condition offense amount in the portion (B) closest to the outside optical function area in the central optical function area, and further, in the central optical function area, it is made that DVD is a positive value and CD is a negative value, and their absolute values are almost equal.

According to the present invention, the objective lens for the optical pick-up apparatus by which the coma can be corrected with well balance, and the information can be adequately recorded or reproduced onto the different optical information recording media, and the optical pick-up apparatus, can be provided.

What is claimed is:

1. An objective lens for use in an optical pickup apparatus which has a first light source to emit a light flux having a wavelength λ1 for conducting recording or reproducing information by irradiating the light flux onto a first optical information recording medium with a transparent substrate having a thickness t1, a second light source to emit a light flux having a wavelength λ2 (λ1<λ2) for conducting recording or reproducing information by irradiating the light flux onto a second optical information recording medium with a transparent substrate having a thickness t2 (t1<t2), and a light converging optical system including an objective lens to converge each of the light fluxes from the first and second light sources onto an information recording plane through each of the transparent substrates of the first and second optical information recording mediums, wherein the first and second light sources are provided on a same flat surface, the objective lens having:
   a coma aberration of 0.015 λ1 rms or less when recording or reproducing information is conducted for the first optical information recording medium, and
   a coma aberration of 0.015 λ2 rms or less when recording or reproducing information is conducted for the second optical information recording medium.

2. The objective lens of claim 1, wherein the first light source is located substantially on an optical axis and the second light source is located distant by a predetermined distance from the optical axis.

3. The objective lens of claim 1, wherein the first and second light sources are made in a single unit.

4. The objective lens of claim 1, wherein the coma aberration is 0.01 $\lambda 1$ rms or less when recording or reproducing information is conducted for the first optical information recording medium, and the coma aberration is 0.01 $\lambda 2$ rms or less when recording or reproducing information is conducted for the second optical information recording medium.

5. The objective lens of claim 1, wherein the objective lens comprises an optical surface having a central optical functional region including an optical axis and an outside optical functional region distant from the optical axis, and wherein a light flux having passed through the central optical functional region is used for conducting recording or reproducing information for both of the first and second optical information recording mediums and a light flux having passed through the outside optical functional region is used for conducting recording or reproducing information for only the first optical information recording medium.

6. The objective lens of claim 5, wherein when recording or reproducing information is conducted for the first optical information recording medium with a light flux from the first light source, the sine condition offense amount in the outside optical functional region is discontinuous to the sine condition offense amount in the central optical functional region.

7. The objective lens of claim 5, wherein the absolute value of the sine condition offense amount in the central optical functional region when recording or reproducing information is conducted for the first optical information recording medium with a light flux from the first light source is substantially equal to the absolute value of the sine condition offense amount in the central optical functional region when recording or reproducing information is conducted for the second optical information recording medium with a light flux from the second light source.

8. The objective lens of claim 5, wherein a diffractive structure is provided on the central optical functional region.

9. The objective lens of claim 5, wherein the central optical functional region is divided into plural ring-shaped zones with a center on the optical axis so that the central optical functional region has an optical path difference providing function by which neighboring ring-shaped zones cause an optical path difference corresponding to almost a length obtained by multiplying a predetermined wavelength $\lambda_s$ with an integer.

10. The objective lens of claim 5, wherein a diffractive structure is provided on the outside optical functional region.

11. The objective lens of claim 5, wherein the outside optical functional region is divided into plural ring-shaped zones with a center on the optical axis so that the outside optical functional region has an optical path difference providing function by which neighboring ring-shaped zones cause an optical path difference corresponding to almost a length obtained by multiplying a predetermined wavelength $\lambda_s$ with an integer.

12. The objective lens of claim 5, wherein the objective lens converges each of the light fluxes from the first and second light sources onto each of the first and second optical information recording mediums, and the optical pickup apparatus comprises an inclination providing optical element dividing at least one of a light flux from the first light source and a light flux from the second light source among light fluxes incident in the objective lens into a central light flux converging along the optical axis onto a corresponding optical information recording medium and a peripheral light flux converging with an inclination toward to the outside of the optical axis onto the corresponding optical information recording medium, a central light receiving member to receive the central light flux and a peripheral light receiving member to receive the peripheral light flux.

13. An optical pickup apparatus, comprising:

a first light source to emit a light flux having a wavelength $\lambda 1$ for conducting recording or reproducing information by irradiating the light flux onto a first optical information recording medium with a transparent substrate having a thickness t1;

a second light source to emit a light flux having a wavelength $\lambda 2$ ($\lambda 1 < \lambda 2$) for conducting recording or reproducing information by irradiating the light flux onto a second optical information recording medium with a transparent substrate having a thickness t2 (t1<t2); and a light converging optical system including an objective lens to converge each of the light fluxes from the first and second light sources onto a respective information recording plane through each of the transparent substrates of the first and second optical information recording mediums, wherein the first and second light sources are provided on a same flat surface, and the objective lens has a coma aberration of 0.015 $\lambda 1$ rms or less when recording or reproducing information is conducted for the first optical information recording medium, and a coma aberration of 0.015 $\lambda 2$ rms or less when recording or reproducing information is conducted for the second optical information recording medium.

14. The optical pickup apparatus of claim 13, wherein the first light source is located substantially on an optical axis and the second light source is located distant by a predetermined distance from the optical axis.

15. The optical pickup apparatus of claim 13, wherein the first and second light sources are made in a single unit.

16. The optical pickup apparatus of claim 13, wherein the coma aberration is 0.01 $\lambda 1$ rms or less when recording or reproducing information is conducted for the first optical information recording medium, and the coma aberration is 0.01 $\lambda 2$ rms or less when recording or reproducing information is conducted for the second optical information recording medium.

17. The optical pickup apparatus of claim 13, wherein the objective lens comprises a central optical functional region including an optical axis and an outside optical functional region distant from the optical axis, and wherein a light flux having passed through the central optical functional region is used for conducting recording or reproducing information for both of the first and second optical information recording mediums and a light flux having passed through the outside optical functional region is used for conducting recording or reproducing information for only the first optical information recording medium.

18. The optical pickup apparatus of claim 17, wherein when recording or reproducing information is conducted for the first optical information recording medium with a light flux from the first light source, the sine condition offense amount in the outside optical functional region of the objective lens is discontinuous to the sine condition offense amount in the central optical functional region.

19. The optical pickup apparatus of claim 17, wherein the absolute value of the sine condition offense amount in the central optical functional region of the objective lens when recording or reproducing information is conducted for the first optical information recording medium with a light flux from the first light source is substantially equal to the absolute value of the sine condition offense amount in the central optical functional region when recording or reproducing information is conducted for the second optical information recording medium with a light flux from the second light source.

20. The optical pickup apparatus of claim 17, wherein a diffractive structure is provided on the central optical functional region of the objective lens.

21. The optical pickup apparatus of claim 17, wherein the central optical functional region of the objective lens is divided into plural ring-shaped zones with a center on the optical axis so that the central optical functional region has an optical path difference providing function by which neighboring ring-shaped zones cause an optical path difference corresponding to almost a length obtained by multiplying a predetermined wavelength $\lambda_s$ with an integer.

22. The optical pickup apparatus of claim 17, wherein a diffractive structure is provided on the outside optical functional region of the objective lens.

23. The optical pickup apparatus of claim 17, wherein the outside optical functional region of the objective lens is divided into plural ring-shaped zones with a center on the optical axis so that the outside optical functional region has an optical path difference providing function by which neighboring ring-shaped zones cause an optical path difference corresponding to almost a length obtained by multiplying a predetermined wavelength $\lambda_s$ with an integer.

24. The optical pickup apparatus of claim 17, wherein the objective lens converges each of the light fluxes from the first and second light sources onto each of the first and second optical information recording mediums, and the optical pickup apparatus comprises an inclination providing optical element dividing at least one of a light flux from the first light source and a light flux from the second light source among light fluxes incident in the objective lens into a central light flux converging along the optical axis onto a corresponding optical information recording medium and a peripheral light flux converging with an inclination toward to the outside of the optical axis onto the corresponding optical information recording medium, a central light receiving member to receive the central light flux and a peripheral light receiving member to receive the peripheral light flux.

25. An objective lens for use in an optical pickup apparatus which has a first light source to emit a light flux having a wavelength $\lambda 1$ for conducting recording or reproducing information by irradiating the light flux onto a first optical information recording medium with a transparent substrate having a thickness t1, a second light source to emit a light flux having a wavelength $\lambda 2$ ($\lambda 1 < \lambda 2$) for conducting recording or reproducing information by irradiating the light flux onto a second optical information recording medium with a transparent substrate having a thickness t2 (t1<t2), and a light converging optical system including an objective lens to converge each of the light fluxes from the first and second light sources onto a respective information recording plane through each of the transparent substrates of the first and second optical information recording mediums, the objective lens comprising:

an optical surface including a central optical functional region including an optical axis and an outside optical functional region distant from the optical axis, wherein a light flux having passed through the central optical functional region is used for conducting recording or reproducing information for both of the first and second optical information recording mediums and a light flux having passed through the outside optical functional region is used for conducting recording or reproducing information for only the first optical information recording medium;

wherein when recording or reproducing information is conducted for the first optical information recording medium with a light flux from the first light source, the sine condition offense amount in the central optical functional region is a positive value, and when recording or reproducing information is conducted for the second optical information recording medium with a light flux from the second light source, the sine condition offense amount in the central optical functional region is a negative value, and wherein when recording or reproducing information is conducted for the first optical information recording medium with a light flux from the first light source, the sine condition offense amount at a portion of the outside optical functional region positioned closest to the central optical functional region is smaller than that at a portion of the central optical functional region positioned closest to the outside optical functional region.

26. The objective lens of claim 25, wherein when recording or reproducing information is conducted for the first optical information recording medium with a light flux from the first light source, the sine condition offense amount in the outside optical functional region is discontinuous to the sine condition offense amount in the central optical functional region.

27. The objective lens of claim 25, wherein the absolute value of the sine condition offense amount in the central optical functional region when recording or reproducing information is conducted for the first optical information recording medium with a light flux from the first light source is substantially equal to the absolute value of the sine condition offense amount in the central optical functional region when recording or reproducing information is conducted for the second optical information recording medium with a light flux from the second light source.

28. The objective lens of claim 25, wherein a diffractive structure is provided on the central optical functional region.

29. The objective lens of claim 25, wherein the central optical functional region is divided into plural ring-shaped zones with a center on the optical axis so that the central optical functional region has an optical path difference providing function by which neighboring ring-shaped zones cause an optical path difference corresponding to almost a length obtained by multiplying a predetermined wavelength $\lambda_s$ with an integer.

30. The objective lens of claim 25, wherein a diffractive structure is provided on the outside optical functional region.

31. The objective lens of claim 25, wherein the outside optical functional region is divided into plural ring-shaped zones with a center on the optical axis so that the outside optical functional region has an optical path difference providing function by which neighboring ring-shaped zones cause an optical path difference corresponding to almost a length obtained by multiplying a predetermined wavelength $\lambda_s$ with an integer.

32. An optical pickup apparatus, comprising:

a first light source to emit a light flux having a wavelength $\lambda 1$ for conducting recording or reproducing information by irradiating the light flux onto a first optical information recording medium with a transparent substrate having a thickness t1;

a second light source to emit a light flux having a wavelength λ2 (λ1<λ2) for conducting recording or reproducing information by irradiating the light flux onto a second optical information recording medium with a transparent substrate having a thickness t2 (t1<t2); and a light converging optical system including an objective lens to converge each of the light fluxes from the first and second light sources onto a respective information recording plane through each of the transparent substrates of the first and second optical information recording mediums, wherein the objective lens comprises an optical surface including a central optical functional region including an optical axis and an outside optical functional region distant from the optical axis, and a light flux having passed through the central optical functional region is used for conducting recording or reproducing information for both of the first and second optical information recording mediums and a light flux having passed through the outside optical functional region is used for conducting recording or reproducing information for only the first optical information recording medium;

wherein when recording or reproducing information is conducted for the first optical information recording medium with a light flux from the first light source, the sine condition offense amount in the central optical functional region is a positive value, and when recording or reproducing information is conducted for the second optical information recording medium with a light flux from the second light source, the sine condition offense amount in the central optical functional region is a negative value, and wherein when recording or reproducing information is conducted for the first optical information recording medium with a light flux from the first light source, the sine condition offense amount at a portion of the outside optical functional region positioned closest to the central optical functional region is smaller than that at a portion of the central optical functional region positioned closest to the outside optical functional region.

33. The optical pickup apparatus of claim 32, wherein when recording or reproducing information is conducted for the first optical information recording medium with a light flux from the first light source, the sine condition offense amount in the outside optical functional region of the objective lens is discontinuous to the sine condition offense amount in the central optical functional region.

34. The optical pickup apparatus of claim 32, wherein the absolute value of the sine condition offense amount in the central optical functional region of the objective lens when recording or reproducing information is conducted for the first optical information recording medium with a light flux from the first light source is substantially equal to the absolute value of the sine condition offense amount in the central optical functional region when recording or reproducing information is conducted for the second optical information recording medium with a light flux from the second light source.

35. The optical pickup apparatus of claim 32, wherein a diffractive structure is provided on the central optical functional region of the objective lens.

36. The optical pickup apparatus of claim 32, wherein the central optical functional region of the objective lens is divided into plural ring-shaped zones with a center on the optical axis so that the central optical functional region has an optical path difference providing function by which neighboring ring-shaped zones cause an optical path difference corresponding to almost a length obtained by multiplying a predetermined wavelength $\lambda_s$ with an integer.

37. The optical pickup apparatus of claim 32, wherein a diffractive structure is provided on the outside optical functional region of the objective lens.

38. The optical pickup apparatus of claim 32, wherein the outside optical functional region of the objective lens is divided into plural ring-shaped zones with a center on the optical axis so that the outside optical functional region has an optical path difference providing function by which neighboring ring-shaped zones cause an optical path difference corresponding to almost a length obtained by multiplying a predetermined wavelength $\lambda_s$ with an integer.

39. An objective lens for use in an optical pickup apparatus which has a first light source to emit a light flux having a wavelength λ1 for conducting recording or reproducing information by irradiating the light flux onto a first optical information recording medium with a transparent substrate having a thickness t1, a second light source to emit a light flux having a wavelength λ2 (λ1<λ2) for conducting recording or reproducing information by irradiating the light flux onto a second optical information recording medium with a transparent substrate having a thickness t2 (t1<t2), and a light converging optical system including an objective lens to converge each of the light fluxes from the first and second light sources onto a respective information recording plane through each of the transparent substrates of the first and second optical information recording mediums, wherein the first and second light sources are provided on a same flat surface, the first light source is located substantially on an optical axis and the second light source is located distant by a predetermined distance from the optical axis, the objective lens comprising:

an optical surface including a central optical functional region including an optical axis and an outside optical functional region distant from the optical axis, wherein a light flux having passed through the central optical functional region is used for conducting recording or reproducing information for both of the first and second optical information recording mediums and a light flux having passed through the outside optical functional region is used for conducting recording or reproducing information for only the first optical information recording medium;

wherein when recording or reproducing information is conducted for the first optical information recording medium with a light flux from the first light source, the sine condition offense amount in the central optical functional region is a positive value, and when recording or reproducing information is conducted for the second optical information recording medium with a light flux from the second light source, the sine condition offense amount in the central optical functional region is a negative value, wherein when recording or reproducing information is conducted for the first optical information recording medium with a light flux from the first light source, the sine condition offense amount at a portion of the outside optical functional region positioned closest to the central optical functional region is smaller than that at a portion of the central optical functional region positioned closest to the outside optical functional region, and wherein the objective lens has a coma aberration of 0.015 λ1 rms or less when recording or reproducing information is conducted for the first optical information recording medium, and a coma aberration of 0.015 $\lambda 2$ rms or less when recording or reproducing information is conducted for the second optical information recording medium.

40. The objective lens of claim 39, wherein the first and second light sources are made in a single unit.

41. The objective lens of claim 39, wherein when recording or reproducing information is conducted for the first optical information recording medium with a light flux from the first light source, the sine condition offense amount in the outside optical functional region is discontinuous to the sine condition offense amount in the central optical functional region.

42. The objective lens of claim 39, wherein the absolute value of the sine condition offense amount in the central optical functional region when recording or reproducing information is conducted for the first optical information recording medium with a light flux from the first light source is substantially equal to the absolute value of the sine condition offense amount in the central optical functional region when recording or reproducing information is conducted for the second optical information recording medium with a light flux from the second light source.

43. The objective lens of claim 39, wherein a diffractive structure is provided on the central optical functional region.

44. The objective lens of claim 39, wherein the central optical functional region is divided into plural ring-shaped zones with a center on the optical axis so that the central optical functional region has an optical path difference providing function by which neighboring ring-shaped zones cause an optical path difference corresponding to almost a length obtained by multiplying a predetermined wavelength $\lambda_s$ with an integer.

45. The objective lens of claim 39, wherein a diffractive structure is provided on the outside optical functional region.

46. The objective lens of claim 39, wherein the outside optical functional region is divided into plural ring-shaped zones with a center on the optical axis so that the outside optical functional region has an optical path difference providing function by which neighboring ring-shaped zones cause an optical path difference corresponding to almost a length obtained by multiplying a predetermined wavelength $\lambda_s$ with an integer.

47. An optical pickup apparatus, comprising:

a first light source to emit a light flux having a wavelength $\lambda 1$ for conducting recording or reproducing information by irradiating the light flux onto a first optical information recording medium with a transparent substrate having a thickness t1;

a second light source to emit a light flux having a wavelength $\lambda 2$ ($\lambda 1 < \lambda 2$) for conducting recording or reproducing information by irradiating the light flux onto a second optical information recording medium with a transparent substrate having a thickness t2 (t1<t2); and a light converging optical system including an objective lens to converge each of the light fluxes from the first and second light sources onto a respective information recording plane through each of the transparent substrates of the first and second optical information recording mediums, wherein the first and second light sources are provided on a same flat surface, the first light source is located substantially on an optical axis and the second light source is located distant by a predetermined distance from the optical axis, wherein the objective lens comprises an optical surface including a central optical functional region including an optical axis and an outside optical functional region distant from the optical axis, and a light flux having passed through the central optical functional region is used for conducting recording or reproducing information for both of the first and second optical information recording mediums and a light flux having passed through the outside optical functional region is used for conducting recording or reproducing information for only the first optical information recording medium;

wherein when recording or reproducing information is conducted for the first optical information recording medium with a light flux from the first light source, the sine condition offense amount in the central optical functional region is a positive value, and when recording or reproducing information is conducted for the second optical information recording medium with a light flux from the second light source, the sine condition offense amount in the central optical functional region is a negative value, wherein when recording or reproducing information is conducted for the first optical information recording medium with a light flux from the first light source, the sine condition offense amount at a portion of the outside optical functional region positioned closest to the central optical functional region is smaller than that at a portion of the central optical functional region positioned closest to the outside optical functional region, and wherein the objective lens has a coma aberration of 0.015 $\lambda 1$ rms or less when recording or reproducing information is conducted for the first optical information recording medium, and a coma aberration of 0.015 $\lambda 2$ rms or less when recording or reproducing information is conducted for the second optical information recording medium.

48. The optical pickup apparatus of claim 47, wherein the first and second light sources are made in a single unit.

49. The optical pickup apparatus of claim 47, wherein when recording or reproducing information is conducted for the first optical information recording medium with a light flux from the first light source, the sine condition offense amount in the outside optical functional region of the objective lens is discontinuous to the sine condition offense amount in the central optical functional region.

50. The optical pickup apparatus of claim 47, wherein the absolute value of the sine condition offense amount in the central optical functional region of the objective lens when recording or reproducing information is conducted for the first optical information recording medium with a light flux from the first light source is substantially equal to the absolute value of the sine condition offense amount in the central optical functional region when recording or reproducing information is conducted for the second optical information recording medium with a light flux from the second light source.

51. The optical pickup apparatus of claim 47, wherein a diffractive structure is provided on the central optical functional region of the objective lens.

52. The optical pickup apparatus of claim 47, wherein the central optical functional region of the objective lens is divided into plural ring-shaped zones with a center on the optical axis so that the central optical functional region has an optical path difference providing function by which neighboring ring-shaped zones cause an optical path difference corresponding to almost a length obtained by multiplying a predetermined wavelength $\lambda_s$ with an integer.

53. The optical pickup apparatus of claim 47, wherein a diffractive structure is provided on the outside optical functional region of the objective lens.

54. The optical pickup apparatus of claim 47, wherein the outside optical functional region of the objective lens is divided into plural ring-shaped zones with a center on the optical axis so that the outside optical functional region has an optical path difference providing function by which neighboring ring-shaped zones cause an optical path difference corresponding to almost a length obtained by multiplying a predetermined wavelength $\lambda_s$ with an integer.

55. An objective lens for use in an optical pickup apparatus which has a first light source to emit a light flux having a wavelength $\lambda 1$ for conducting recording or reproducing information by irradiating the light flux onto a first optical information recording medium with a transparent substrate having a thickness t1, a second light source to emit a light flux having a wavelength $\lambda 2$ ($\lambda 1<\lambda 2$) for conducting recording or reproducing information by irradiating the light flux onto a second optical information recording medium with a transparent substrate having a thickness t2 (t1<t2), and a light converging optical system including an objective lens to converge each of the light fluxes from the first and second light sources onto a respective information recording plane through the transparent substrate of the first and second optical information recording mediums, wherein the objective lens converges a light flux from the first and second light sources onto the first and second optical information recording mediums, and the optical pickup apparatus further comprises an inclination providing optical element dividing at least one of a light flux from the first light source and a light flux from the second light source among light fluxes incident in the objective lens into a central light flux converging along the optical axis onto a corresponding optical information recording medium and a peripheral light flux converging with an inclination toward to the outside of the optical axis onto the corresponding optical information recording medium, a central light receiving member to receive the central light flux and a peripheral light receiving member to receive the peripheral light flux, the objective lens comprising:

an optical surface including a central optical functional region including an optical axis and an outside optical functional region distant from the optical axis, wherein a light flux having passed through the central optical functional region is used for conducting recording or reproducing information for both of the first and second optical information recording mediums and a light flux having passed through the outside optical functional region is used for conducting recording or reproducing information for only the first optical information recording medium;

wherein when recording or reproducing information is conducted for the first optical information recording medium with a light flux from the first light source, the sine condition offense amount in the central optical functional region is a positive value, and when recording or reproducing information is conducted for the second optical information recording medium with a light flux from the second light source, the sine condition offense amount in the central optical functional region is a negative value, and wherein when recording or reproducing information is conducted for the first optical information recording medium with a light flux from the first light source, the sine condition offense amount at a portion of the outside optical functional region positioned closest to the central optical functional region is smaller than that at a portion of the central optical functional region positioned closest to the outside optical functional region.

56. The objective lens of claim 55, wherein the inclination providing optical element divides a light flux when recording and/or reproducing is conducted for the first optical information recording medium.

57. The objective lens of claim 55, wherein the inclination providing optical element divides a light flux when recording and/or reproducing is conducted for the second optical information recording medium.

58. An optical pickup apparatus, comprising:

a first light source to emit a light flux having a wavelength $\lambda 1$ for conducting recording or reproducing information by irradiating the light flux onto a first optical information recording medium with a transparent substrate having a thickness t1;

a second light source to emit a light flux having a wavelength $\lambda 2$ ($\lambda 1<\lambda 2$) for conducting recording or reproducing information by irradiating the light flux onto a second optical information recording medium with a transparent substrate having a thickness t2 (t1<t2); and a light converging optical system including an objective lens to converge each of the light fluxes from the first and second light sources onto a respective information recording plane through each of the transparent substrates of the first and second optical information recording mediums, wherein the objective lens converges a light flux from the first and second light sources onto the first and second optical information recording mediums, wherein the optical pickup apparatus further comprises an inclination providing optical element dividing at least one of a light flux from the first light source and a light flux from the second light source among light fluxes incident in the objective lens into a central light flux converging along the optical axis onto a corresponding optical information recording medium and a peripheral light flux converging with an inclination toward to the outside of the optical axis onto the corresponding optical information recording medium, a central light receiving member to receive the central light flux and a peripheral light receiving member to receive the peripheral light flux, wherein the objective lens comprises an optical surface including a central optical functional region including an optical axis and an outside optical functional region distant from the optical axis, and a light flux having passed through the central optical functional region is used for conducting recording or reproducing information for both of the first and second optical information recording mediums and a light flux having passed through the outside optical functional region is used for conducting recording or reproducing information for only the first optical information recording medium;

wherein when recording or reproducing information is conducted for the first optical information recording medium with a light flux from the first light source, the sine condition offense amount in the central optical functional region is a positive value, and when recording or reproducing information is conducted for the second optical information recording medium with a light flux from the second light source, the sine condition offense amount in the central optical functional region is a negative value, and wherein when recording or reproducing information is conducted for the first optical information recording medium with a light flux from the first light source, the sine condition offense amount at a portion of the outside optical functional region positioned closest to the central optical functional region is smaller than that at a portion of the central optical functional region positioned closest to the outside optical functional region.

59. The optical pickup apparatus of claim 58, wherein the inclination providing optical element divides a light flux when recording and/or reproducing is conducted for the first optical information recording medium.

60. The optical pickup apparatus of claim 58, wherein the inclination providing optical element divides a light flux when recording and/or reproducing is conducted for the second optical information recording medium.

61. An objective lens for use in an optical pickup apparatus which has a first light source to emit a light flux having a wavelength $\lambda 1$ for conducting recording or reproducing information by irradiating the light flux onto a first optical information recording medium with a transparent substrate having a thickness t1, a second light source to emit a light flux having a wavelength $\lambda 2$ ($\lambda 1 < \lambda 2$) for conducting recording or reproducing information by irradiating the light flux onto a second optical information recording medium with a transparent substrate having a thickness t2 (t1<t2), and a light converging optical system including an objective lens to converge each of the light fluxes from the first and second light sources onto a respective information recording plane through each of the transparent substrates of the first and second optical information recording mediums, the objective lens comprising:

a light source side optical surface including a central optical functional region including an optical axis and an outside optical functional region distant from the optical axis, wherein diffractive structures are formed on the central and outside optical functional regions and a light flux having passed through the central optical functional region is used for conducting recording or reproducing information for both of the first and second optical information recording mediums and a light flux having passed through the outside optical functional region is used for conducting recording or reproducing information for only the first optical information recording medium, and an optical information recording medium side optical surface including a central optical functional region including an optical axis and an outside optical functional region distant from the optical axis, wherein a refractive surface is formed on the central optical functional region and another refractive surface different in aspherical coefficient from that of the refractive surface is formed on the outside optical functional surface, and a light flux having passed through the central optical functional region is used for conducting recording or reproducing information for both of the first and second optical information recording medium and a light flux having passed through the outside optical functional region is used for conducting recording or reproducing information for only the first optical information recording medium.

62. An optical pickup apparatus, comprising:

a first light source to emit a light flux having a wavelength $\lambda 1$ for conducting recording or reproducing information by irradiating the light flux onto a first optical information recording medium with a transparent substrate having a thickness t1;

a second light source to emit a light flux having a wavelength $\lambda 2$ ($\lambda 1 < \lambda 2$) for conducting recording or reproducing information by irradiating the light flux onto a second optical information recording medium with a transparent substrate having a thickness t2 (t1<t2); and a light converging optical system including an objective lens to converge each of the light fluxes from the first and second light sources onto a respective information recording plane through each of the transparent substrates of the first and second optical information recording mediums, wherein the objective lens comprises:

a light source side optical surface including a central optical functional region including an optical axis and an outside optical functional region distant from the optical axis, wherein diffractive structures are formed on the central and outside optical functional regions and a light flux having passed through the central optical functional region is used for conducting recording or reproducing information for both of the first and second optical information recording mediums and a light flux having passed through the outside optical functional region is used for conducting recording or reproducing information for only the first optical information recording medium, and an optical information recording medium side optical surface including a central optical functional region including an optical axis and an outside optical functional region distant from the optical axis, wherein a refractive surface is formed on the central optical functional region and another refractive surface different in aspherical coefficient from that of the refractive surface is formed on the outside optical functional surface, and a light flux having passed through the central optical functional region is used for conducting recording or reproducing information for both of the first and second optical information recording mediums and a light flux having passed through the outside optical functional region is used for conducting recording or reproducing information for only the first optical information recording medium.

* * * * *